H. W. FORSLUND.
MECHANICAL CONTROLLER.
APPLICATION FILED JUNE 27, 1907.

954,508.

Patented Apr. 12, 1910.
7 SHEETS—SHEET 1.

Witnesses:
G. V. Domarus
J. H. Jochum, Jr.

Inventor:
H. W. Forslund
by Brown & Hopkins
Attys

H. W. FORSLUND.
MECHANICAL CONTROLLER.
APPLICATION FILED JUNE 27, 1907.

954,508.

Patented Apr. 12, 1910.
7 SHEETS—SHEET 2.

Witnesses:

Inventor:
H. W. Forslund
by Brown & Hopkins
Attys

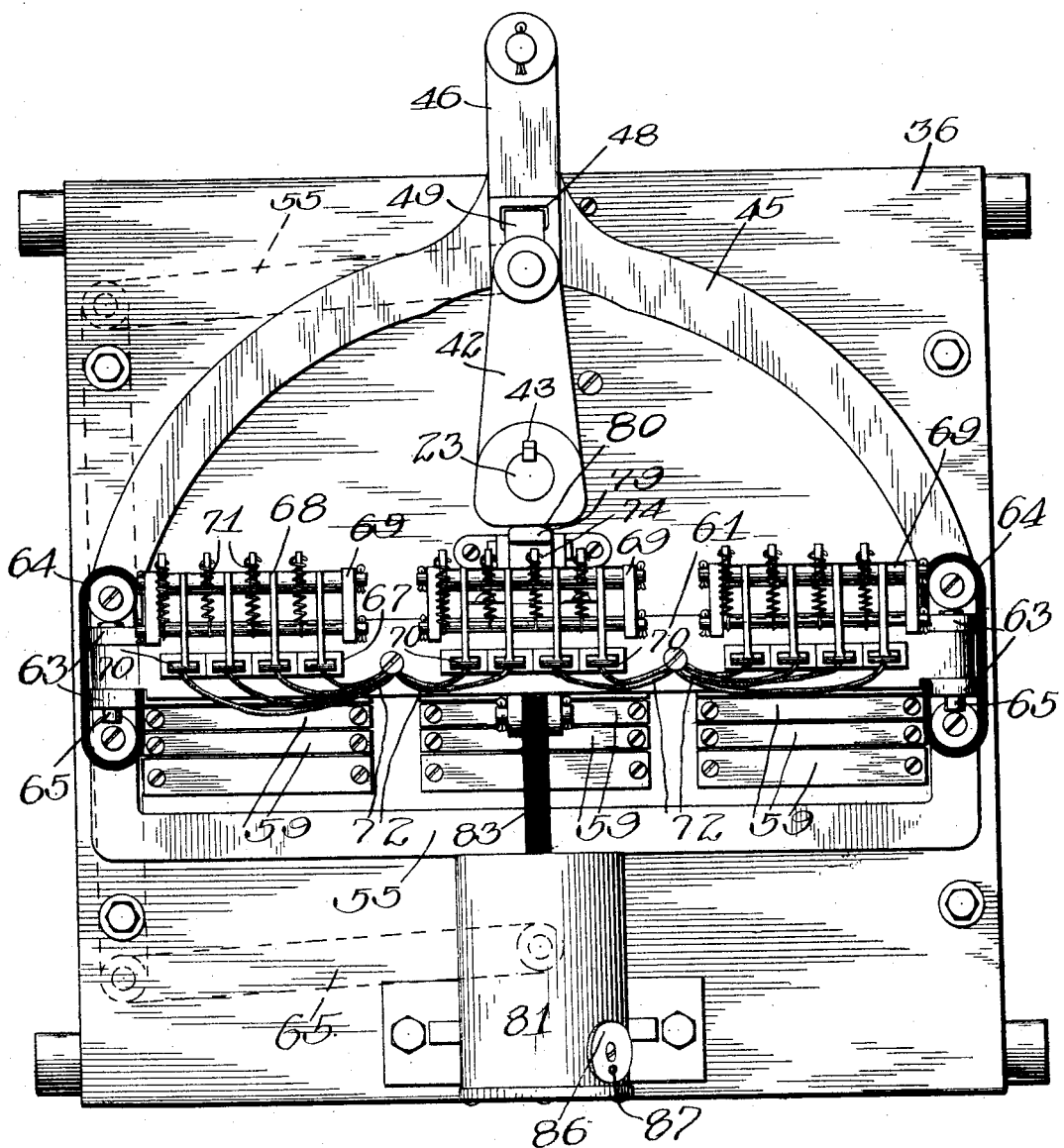

H. W. FORSLUND.
MECHANICAL CONTROLLER.
APPLICATION FILED JUNE 27, 1907.
954,508.
Patented Apr. 12, 1910.
7 SHEETS—SHEET 4.
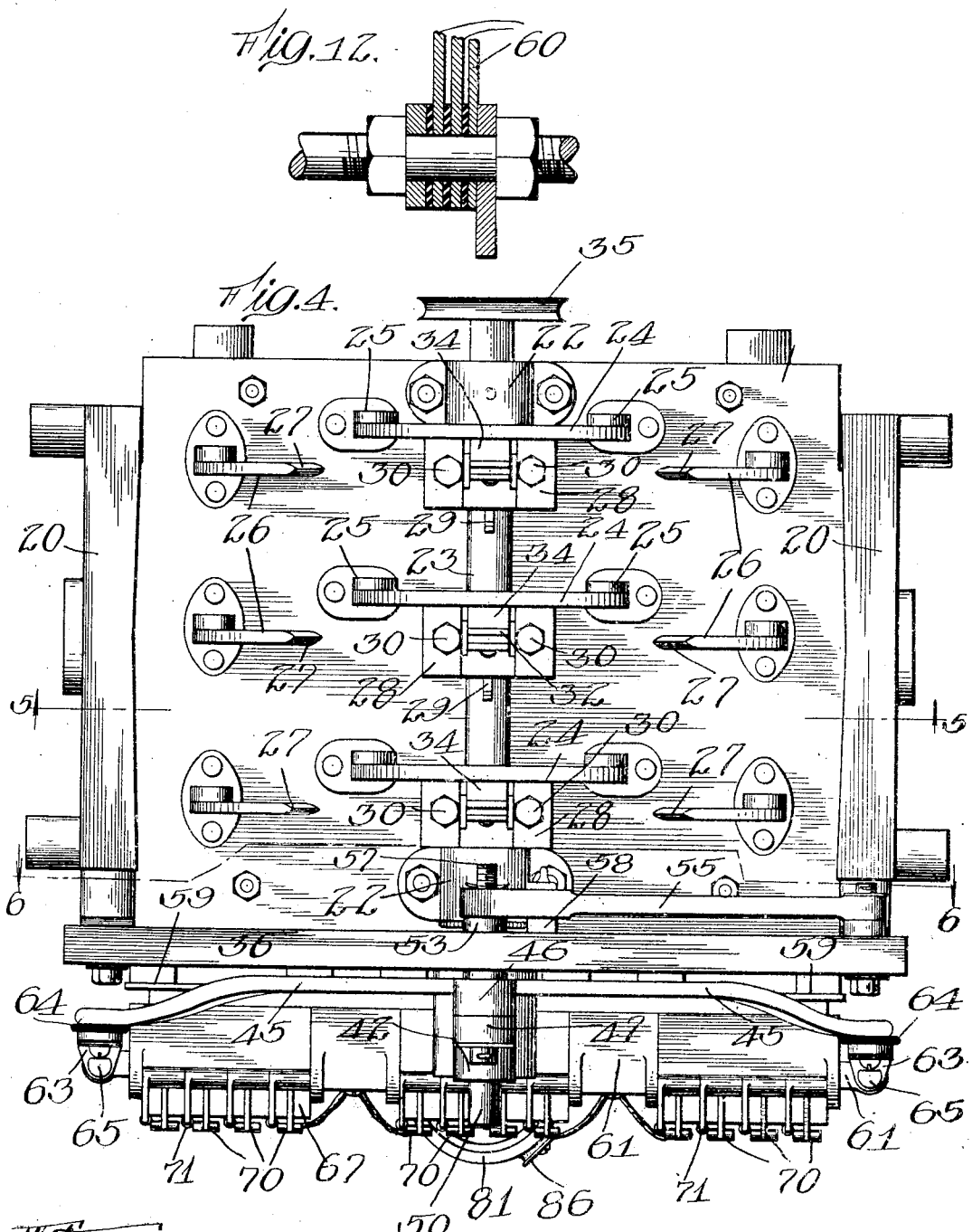

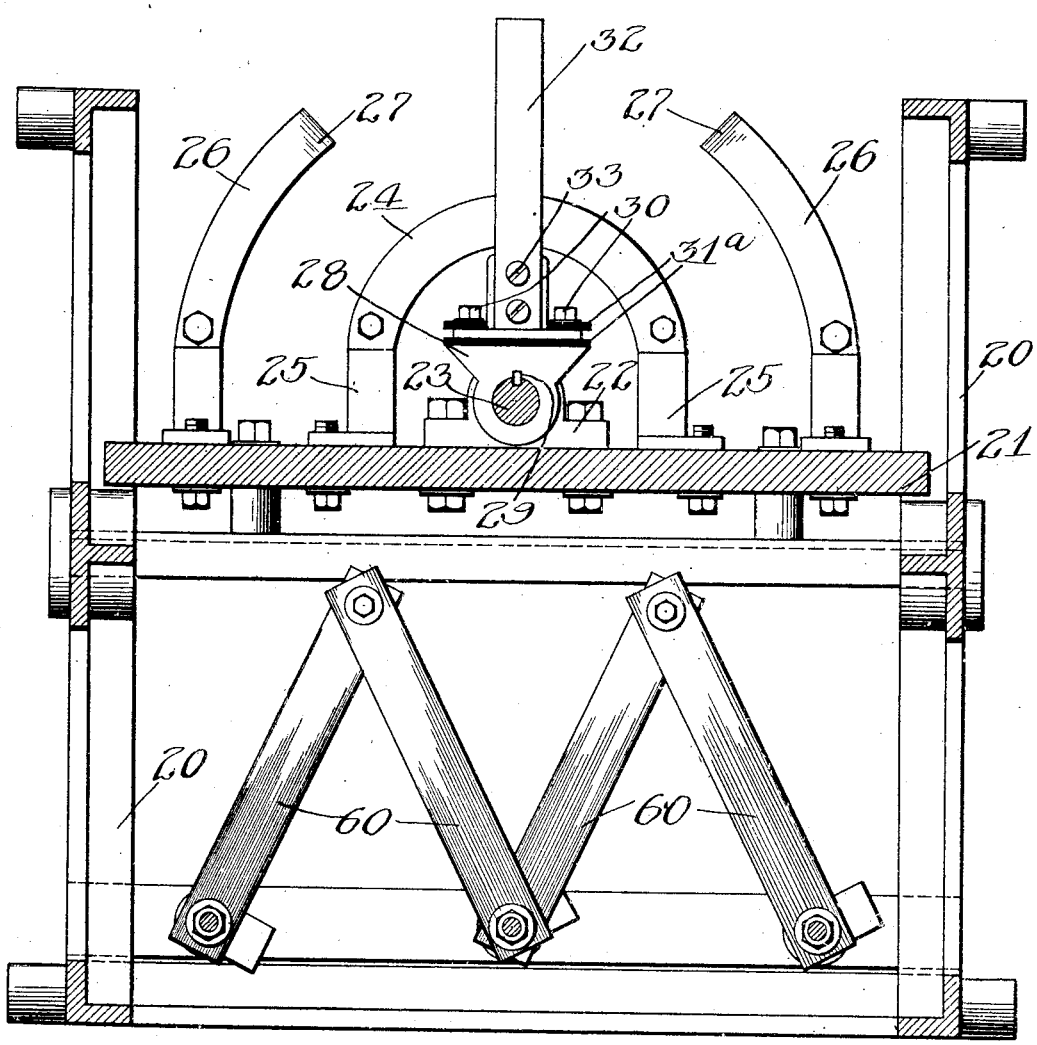

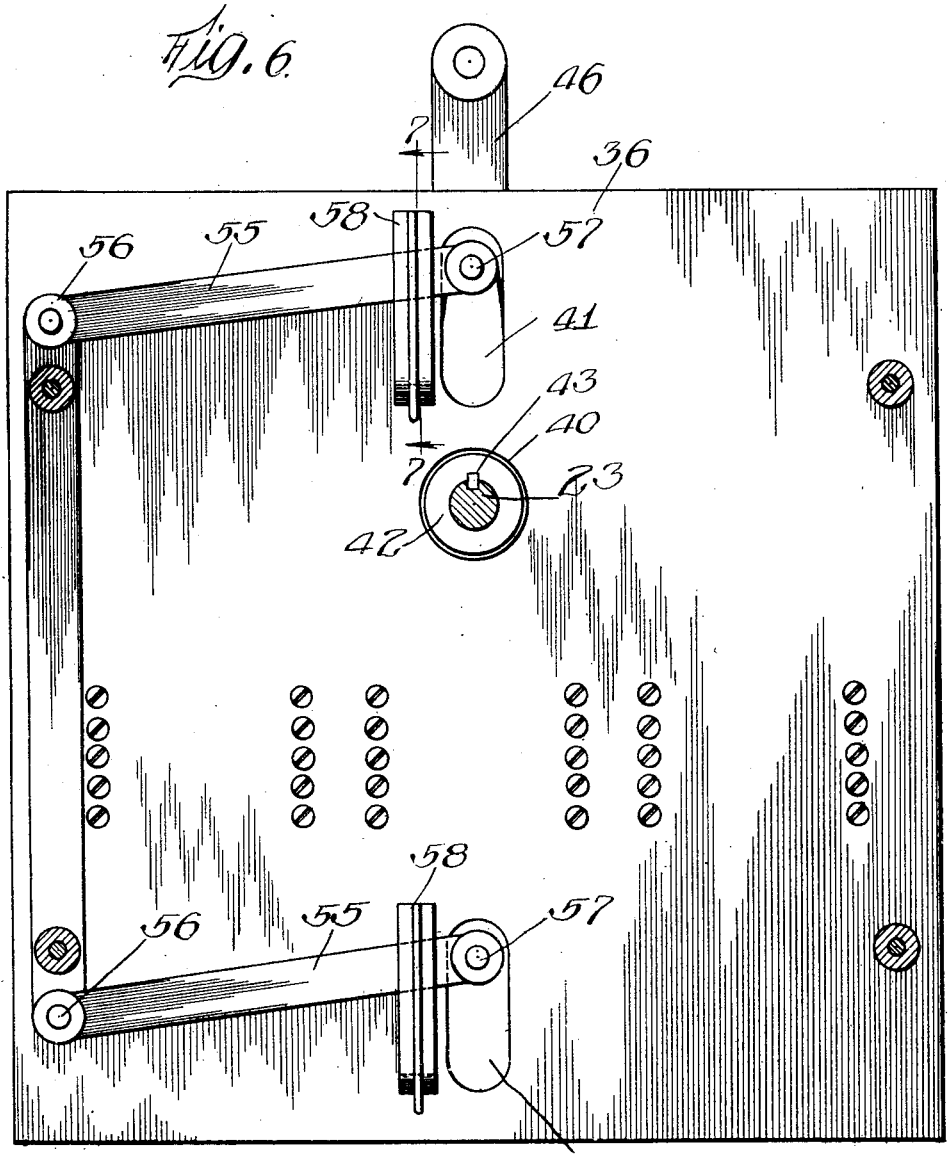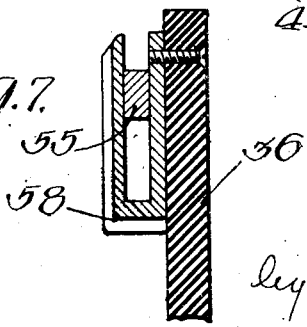

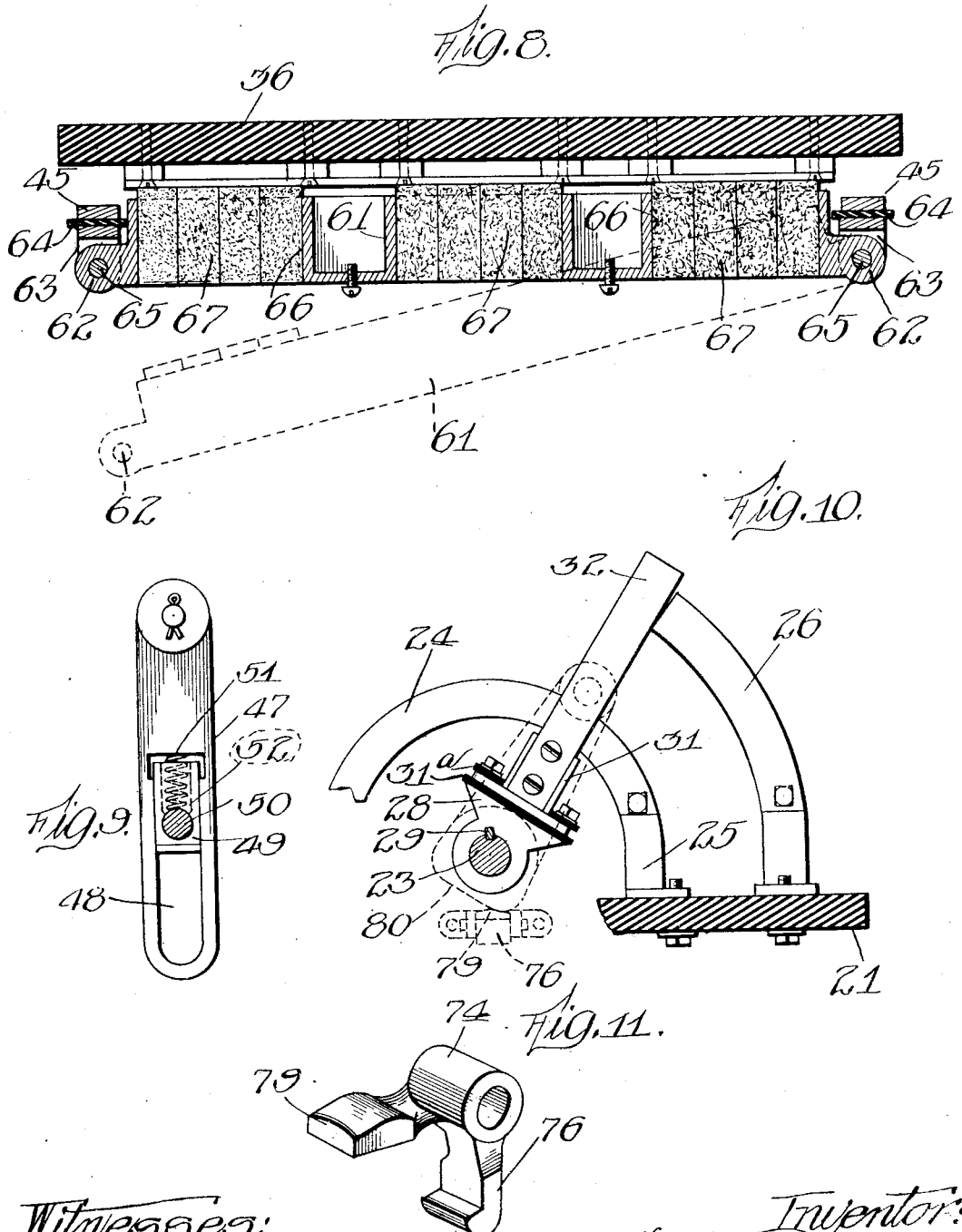

UNITED STATES PATENT OFFICE.

HUGO W. FORSLUND, OF CHICAGO, ILLINOIS, ASSIGNOR TO J. W. REEDY ELEVATOR MANUFACTURING CO., OF CHICAGO, ILLINOIS, A CORPORATION OF ILLINOIS.

MECHANICAL CONTROLLER.

954,508.  Specification of Letters Patent.  Patented Apr. 12, 1910.

Application filed June 27, 1907. Serial No. 381,019.

*To all whom it may concern:*

Be it known that I, HUGO W. FORSLUND, a citizen of the United States, residing at Chicago, in the county of Cook and State of Illinois, have invented certain new and useful Improvements in Mechanical Controllers, of which the following is a specification.

This invention relates to improvements in mechanical controllers, particularly adapted for use in electrical hoisting machinery, such as elevators and the like, and the primary object of the invention is to provide an improved device of this character so constructed and arranged that the arms or brushes forming the circuit closers must be thrown into an extended engagement with the contacts before the controller brushes will be released, thereby compelling the operator to throw the circuit closers or brushes into full contact before the motor will start.

A further object is to provide an improved device of this character in which the controller brushes may be readily removed and new brushes inserted, and the brush supporting bar itself readily removed.

A further object is to provide an improved device of this character which will be simple, cheap and compact in construction, and efficient and effective in operation.

Figure 1:
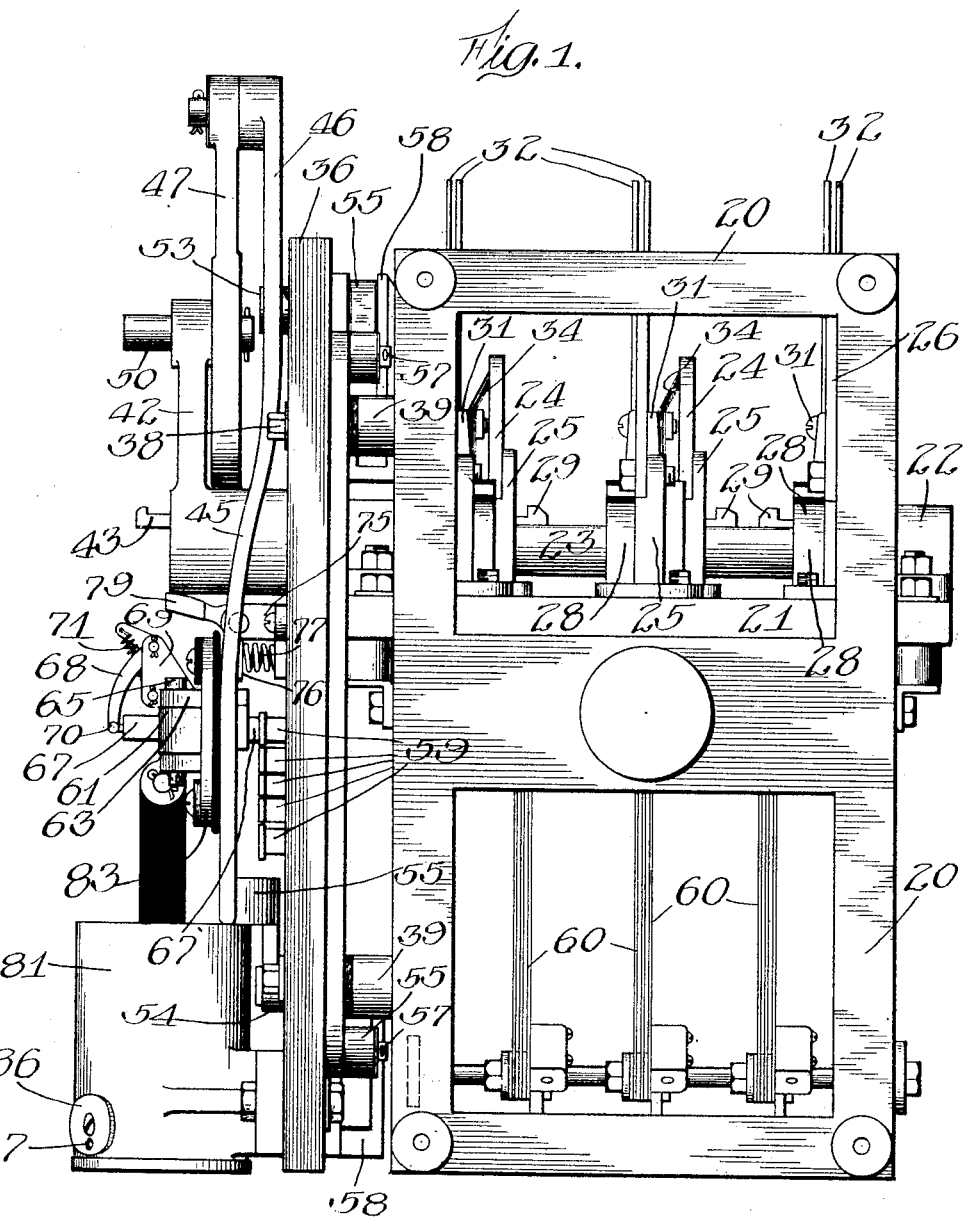
Figure 2:
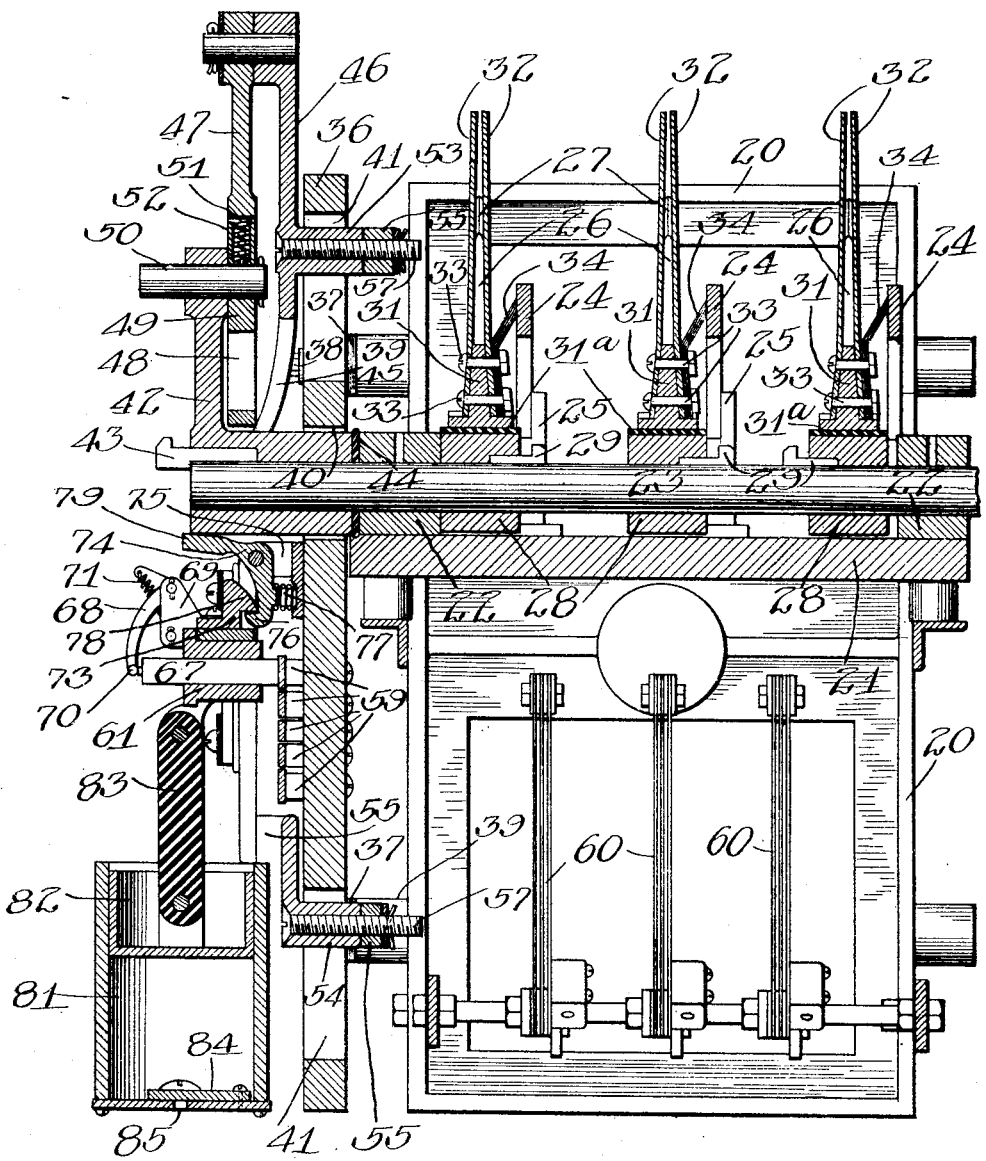

To the attainment of these ends and the accomplishment of other new and useful objects, as will appear, the invention consists in the features of novelty in the construction, combination and arrangement of the several parts hereinafter more fully described and claimed, and shown in the accompanying drawings, illustrating an exemplification of the invention, and in which:

Figure 1 is a side elevation of a controller constructed in accordance with the principles of this invention. Fig. 2 is a longitudinal sectional view of Fig. 1. Fig. 3 is a front elevation of Fig. 1. Fig. 4 is a top plan view. Fig. 5 is a sectional view on line 5—5 of Fig. 4. Fig. 6 is a sectional view on line 6—6 of Fig. 4, looking in the direction of the arrows. Fig. 7 is a sectional view on line 7—7 of Fig. 6. Fig. 8 is a sectional view of the resistance contact support and the controller brush frame with the brushes in position. Fig. 9 is a detail view of the link forming the connection between the operating crank on the end of the shaft and the brush supporting frame. Fig. 10 is an enlarged detail view partly in section of one of the contact brushes or circuit closers and support and the contact arms. Fig. 11 is an enlarged perspective view of the latch for the controller brush support. Fig. 12 is a detail sectional view of a portion of the resistance members.

In the drawings the same reference numerals designate similar parts throughout the several views.

In this exemplification of the invention, the numeral 20 designates a supporting frame of any suitable size and material, preferably rectangular and secured across the frame,—preferably at the center thereof, so as to divide the frame work into an upper and a lower part,—is a supporting platform or table 21, which may be insulated from the frame in any desired manner or may itself be constructed of insulating material.

Suitable bearings 22 are secured to this platform or table, and are located preferably adjacent the front and rear edge thereof, and journaled in these bearings so as to extend across the support or platform and with its forward end projecting beyond the front of the frame, is a shaft 23.

A plurality of contact members 24 are spaced from each other and are preferably arched over the shaft 23 with their ends secured to the support or platform 21, preferably through the medium of brackets 25, which latter are secured directly to the platform or support 21.

A series of contact arms 26 are secured to the platform or support 21, on opposite sides of the shaft 23 and preferably adjacent the sides of the platform, and these contacts are arranged diametrically opposite each other in pairs and slightly out of a direct line with their coöperating contact members 24 and are preferably struck on arcs described from the center of the shaft 23 and extend slightly over and are spaced from the contact members 24. The free ends of these arms are preferably beveled or tapered as at 27, for a purpose to be set forth.

Secured to the shaft 23 are suitable collars 28, one preferably adjacent each of the contact members 24, between and in line with the adjacent contacting arms 26. These collars may be held in position and secured to oscillate with the shaft in any desired or suitable manner, preferably by means of keys 29, and secured to each collar by means of screws or bolts 30 is a support 31, which is insulated therefrom in any suitable manner, such as by insulating material 31ª.

The supports preferably taper from their base toward their upper end to form parallel faces to which are secured contact brushes or circuit closers, which preferably comprise spaced flexible members 32, having their lower extremities secured respectively to the inclined faces of the supports 31, preferably by means of bolts or screws 33. In this position, the upper free ends of the members 32 are brought close together, and the space formed between the two coöperating members 32 is slightly less than the thickness of the arms or contacts 26, so that when the members 32 are moved from one side to the other by rocking the shaft 23, in a manner to be hereinafter set forth, the inclined or beveled extremity of the arms or contacts 26 will first pass between the members to separate them, and as the shaft 23 is further rocked, the natural spring of the members 32 will exert considerable friction against the sides of the contacts 26 to form a good electrical contact.

Flexible members or brushes 34, one end of which engage and move over the contact members 24, are secured to the supports 31 in any suitable manner, preferably by means of the screws or bolts 33 which hold the members 32 and which pass through the brushes. The end of the brushes are preferably deflected from the support 31 so as to engage and rest against the members 24.

The shaft 23 may be rocked or oscillated by means of a shipper rope (not shown) which passes around and is secured to a sheave or pulley 35 so that when the rope is operated to rotate the pulley 35, the shaft 23 will be rocked in either direction according to the direction of strain exerted on the sheave 35 by means of the shipper rope, as will be understood. This pulley or sheave 35 is preferably located on the outside of the frame. Secured to the front of the frame 20 is a resistance contact support or member 36, which is preferably spaced from the frame and is insulated therefrom in any suitable manner, preferably by means of the insulation 37, and said support or member may be held in position by means of bolts or screws 38 passing therethrough and into a projecting portion 39 on the frame 20.

If desired, the support or member 36 may itself be constructed of insulating material and is provided with an aperture 40 through which the extremity of the shaft 23 passes and said aperture is of a diameter somewhat larger than the diameter of the shaft 23. This support is also preferably provided with elongated slots or apertures 41 located preferably adjacent the top and bottom thereof and in line with the aperture 40.

Secured to the projecting end of the shaft 23 is a crank 42, which is held in position in any desired or suitable manner, preferably by means of a key 43. The body portion of this crank 42 is of a diameter slightly less than the diameter of the aperture 40 and projects through said aperture from the outer face of the support or member 36 and its inner face is insulated from the adjacent bearing 22 by means of suitable insulation 44. A resistance contact brush supporting frame 45, comprising spaced arms and a centrally projecting portion 46 is arranged preferably between the crank 42 and the support or member 36 in such a manner that the projecting portion 46 will stand adjacent the outer face of the support or member 36 and the spaced arms will stand astride of the shaft 23.

Pivotally supported by the extremity of the projecting portion 46, and by one end thereof, is a link 47, which is provided with a slot or elongated aperture 48 in the free end thereof. The link is so disposed with relation to the crank 42 that the slotted free end thereof will preferably stand between the inner face of the crank and the outer face of the support or member 36.

A bearing 49 is mounted for sliding movement in the slot 48 of the link 47 and journaled in the bearing is one end of a transverse pin or axle 50, which passes through the end of the crank 42. Disposed between the bearing 49 and the upper end of the slot or aperture 42 is a yielding member 51, such as a spring or the like, which serves to reduce the shock or jar of the connecting parts. This member 51 may be held from displacement in any suitable manner, preferably by having one end thereof inserted within a suitable aperture 52 in the bearing 49, the other end of the spring or member 51 projecting beyond the top of the bearing 49 so that when the bearing is brought into proximity to the upper end of the slot 48 the projecting end of the spring or member 51 will engage said end to cause a tension to be exerted upon the spring by a further movement of the bearing 49.

A lateral projection 53 preferably located on the portion 46 of the resistance contact brush support projects through the upper aperture or slot 41 in the member 36 and a similar projection 54, which is located preferably on the portion 55 which connects the extremities of the spaced arms 45, also projects through the lower slot or aperture 41 in the support or member 36, and these projections both extend beyond the inner face of the support of member 36.

Links 55 are pivotally connected by one end 56 to the inner face of the support or member 36 preferably adjacent the respective slots or apertures 41, and the free extremities of these links are pivotally connected respectively to the projections 53, 54 on the resistance contact brush supporting frame in any suitable manner, preferably by means of screws or bolts 57, which pass through the projections 53 and 54 and the free end of the respective links 55 and these links serve to maintain the resistance contact brush supporting frame in a proper position during its movement in a manner to be set forth.

Brackets or guides 58, which are preferably open at their upper ends, are arranged respectively adjacent the slots or apertures and said brackets are adapted to receive the links 55 and to permit a free movement thereof and to hold said links from lateral displacement and also serve as a means to assist in limiting the downward movement of the resistance contact brush supporting frame when the latter is released in a manner to be set forth, and descends.

Secured to and insulated from the face of the support or member 36 are suitable resistance contacts 59, which are connected to the resistance members 60, which latter are preferably located in the lower portion of the frame 20 below the support or platform 21, in any suitable manner (not shown); and said contacts 59 are wired and connected to the resistance members 60 in the usual manner, not necessary to illustrate, so that the uppermost contact member will be connected with all of the resistance members 60 and the next succeeding contact member 59 will be connected to omit some of the resistance members 60 and so on until the lowermost contact member 59 is connected with still a less number of the resistance members 60.

Extending across the aperture or opening formed by the spaced arms 45 and the connecting member 55, is a bar or member 61 and said bar or member is provided with apertures 62 located in the extremities thereof, and said extremities are adapted to be seated between projecting ears or lugs 63, which are secured to and insulated from the arms 45 by means of the insulation 64. These ears or lugs are provided with suitable apertures adapted to register with the respective aperture 62 in the extremities of the bar or member 61, and passing through said registering apertures is a pin or bolt 65. These pins or bolts are removably held in position that either one may be removed so that the other one will form a pivot for the bar or member 61 to permit the latter to be moved laterally with respect to the support or member 36.

Passing transversely through the bar or member 61, and at suitable points intermediate its ends, are apertures 66 and these apertures are so arranged as to be located directly over the contact members 59. Located within these apertures 66 are resistance contact brushes 67 and said brushes are of such a length that one end thereof will project beyond the inner face of the supporting bar or member 61 so that when the latter is in position, the projecting extremities of the brushes 67 will engage and rest against contact members 59. The extremities of these brushes are normally held projected beyond the inner face of the bar or member 61 in any suitable manner, preferably by means of arms 68, which are pivotally supported by one end by suitable brackets 69 and in such a position that the free ends thereof will engage and rest against the outer face of the brushes 67. The free ends of these arms are preferably enlarged as at 70 (shown more clearly in Fig. 3 of the drawings) so as to form an extended bearing surface upon the ends of the brushes 67 and said arms are adapted to exert a yielding pressure upon the ends of the brushes to normally hold the free ends projected by suitable yielding members 71, such as springs or the like. These brushes 67 are preferably arranged in groups according to the number of resistance contacts 59 and said groups each comprise a plurality of brushes 67 and a suitable number of arms 68 are provided for each group according to the number of brushes contained therein. The respective brushes of each group are held in electrical contact with the respective brush of the other groups by means of suitable electrical conductors 72.

Secured to the bar or member 61, preferably at a point intermediate its ends and projecting above the upper face thereof is a dog 73. A latch 74 is pivotally supported intermediate its ends to a bracket 75, which latter is preferably secured to the face of the support or member 36 at a point in close proximity to the body of the crank 42 on the shaft 23. One end 76 of the latch preferably depends below the shaft 23 and is formed into a forwardly projecting hook-shaped extremity. A yielding member 77, such as a spring or the like, is disposed between the member 76 of the latch and its supporting means 75, so as to hold the hook-shaped portion normally in the path of the upward movement of the dog 73 and the face 78 of said dog 73 is beveled or inclined so that when the bar or member 61 and the brushes 67 are raised in a manner to be set forth, the face 78 of the dog will engage the extremity of the latch and rock the same on its pivot to permit the dog to pass and when said dog has passed the hook-shaped extremity, the yielding member 77 will project said extremity into the path of the downward movement of the dog 73 so that said dog will engage the latch to hold or lock the bar or member 61 in its elevated position, so that the contact brushes will be in engagement and rest against the face of the resistance contact 59, to which all of the resistance members 60 are connected. The other extremity 79 of the latch 74 projects forwardly from its point of pivotal support and is preferably substantially parallel with the end of the shaft 23. The upper face of said projecting portion 79 is preferably rounded, as shown more clearly in Figs. 3 and 11, and the lower portion 80 of the body of the crank 42 is preferably flattened, as shown more clearly in Figs. 3 and 10, so as to permit the yielding member 77 to act upon the latch 74 in the manner already described; and when said crank 42 is rocked or oscillated through the medium of the shaft 23 in the manner already set forth, the flattened portion 80 of the body of the crank will engage the rounded face of the projecting portion 79 of the latch to rock the latch about its point of pivotal support and against the tension of the yielding member or spring 77, which will cause the hooked extremity of the portion 76 of the latch to disengage the dog 73 and unlock the bar or member 61 and when said bar or member is unlocked, the weight of the associated parts will cause the resistance contact brush supporting frame to descend and carry the brushes 67 into contact with and over the remaining contacts 59 thereby gradually cutting out the resistance as the contact brushes descend in the usual and well known manner.

In order to prevent a too rapid descent of the brushes 67 when the bar or member 61 is unlocked, which would cause the brushes to move too rapidly over the contacts 59, a suitable dash-pot 81 is provided, within which moves a plunger 82 and said plunger is connected to and insulated from the bar or member 61 by means of an insulated piston rod 83, which is preferably pivotally connected at its extremities to the respective members.

A suitable valve 84 is provided in the dash-pot 81 and covers a suitable aperture 85 therein, so as to permit fluid to enter the dash-pot 81 so that the piston 82 will not retard the raising of the bar or member 61 and the brushes 67.

If desired, the dash-pot may be provided with an aperture in the side thereof, which is adapted to be controlled by a suitable rotatively mounted plug or cap 86, which is provided with an aperture 87 adapted to register with the aperture in the side of the dash-pot 81.

From the above description, it is thought that the operation of this improved controller will be fully understood but briefly stated it is as follows: Assuming the parts to be in the position as shown in Figs. 1, 2 and 4, the controller will be out of operative position; that is, the circuit closers or brushes 32 will be in a position intermediate the contacts 26 and the resistance contact brushes 67 will be in engagement with the resistance contact 59 to which is connected all of the resistance members 60. The plunger 82 in the dash-pot 81 will be raised and the bar or member 61 will be locked in its raised position. When the operator rocks the shaft 23 in either direction by means of the sheave or pulley 35 according to the direction it is desired to move the elevator cage, the first movement of the crank 42 will cause the link 47 to be moved about its pivot by means of the pin or axle 50; a continued motion of the shaft 23 and the crank 42 in the same direction will cause the end of the flattened portion 80 to depress the projecting portion 79 of the latch 74 and move the hook-shaped end 76 against the tension of the spring 77 so as to move said end out of engagement with the dog 73 to release the resistance contact brush supporting frame. As the shaft 23 rocks, it causes the circuit closers or brushes 32 to come into engagement with the contacts 26 and the weight of the descending frame and its associated parts will further rock the shaft 23 and move the brushes or contact members 32 into further or an extended engagement with the contacts 26, thus completing the circuits and causing the elevator to start to move slowly as the dash-pot will retard the descent of the resistance contact brushes 67 and permit said brushes to move slowly over the contacts, thereby gradually cutting out the resistance and insuring a positive connection between the brushes 32 and the contacts 27 before the elevator reaches its speed limit. The spring 51 in the box or bearing 49 serves to take the jar off of the shaft and the frame as the frame reaches the limit of its downward movement and coöperates with the dash-pot. The brushes 34 remaining in contact with the members 24 will form a complete circuit to the contacts 26 through the brushes 32. The parts will remain in this position, that is, the contact resistance brushes 67 will remain in engagement with the lowermost resistance contact 59 or the contact with which the less number of resistance members 60 are connected until the shaft 23 is rotated in the opposite direction by the operator. When the elevator has reached the limit of its movement, the operator rocks the shaft 23 in the opposite direction until the contact brushes or circuit closers 32 assume a normal position, that is, a position intermediate the contacts 26, the crank 42 being disposed with relation to the shaft 23 so as to preferably be in a direct line with the brushes 32.

When the shaft has been rocked to its normal position, the crank 42 will assume an upright position, as shown more clearly in Fig. 2, and in being turned from its operative position just described the bolt or axle 50 will move the link 47 about its point of pivotal support and cause the box or bearing 49 to assume a position that the yielding member or spring will come into engagement with the top of the slot 48 and will bodily raise the link 47 together with the resistance contact brush supporting frame and move the brushes 67 over the resistance contacts 59 until the dog 73 engages and is locked by the latch 74, the flattened portion 80 of the crank 42 having assumed a position with relation to the projecting portion 79 of the latch 74 to permit the latter to operate.

When it is desired to move the elevator cage in the opposite direction, the shaft 23 is rotated to cause the contact brushes 32 to engage the opposite contacts 26, which will complete the circuit through these latter contacts, as will be understood.

The resistance members 60 may be constructed in any desired manner but are preferably formed of a plurality of members insulated from each other, the ends of which may be pivotally connected, as shown more clearly in Fig. 12, so as to form flexible resistance members and may also be supported in any desired manner in the base of the frame 20.

It will be noted that with this improved construction of contact brush support, either one of the pins or bolts 65 may be removed after which the supporting bar or member 61 may be turned on the other pin or bolt 63 as a pivot so as to swing the bar or member 61 out or away from the resistance contacts 59 to permit the contacts to be cleaned when desired.

It will also be noted that with the improved construction of latch 74 and crank 42, that all danger of accidents will be prevented by the sudden starting of the motor, as it compels the operator to throw the operating lever into such a position that the brushes 32 will be moved into full contact before the brush supporting frame will be released to permit the resistance to be cut out and the gradual descent of the brushes permits a uniform and steady cutting out of the resistance and thereby causes the motor to start gradually.

In order that the invention might be fully understood, the details of an embodiment thereof have been thus specifically described.

What I claim is:—

1. In a device of the class described, the combination of a support, a contact on the support, a rock shaft, a brush secured to the shaft and engaging the contact, a plurality of contacts adapted to individually coöperate with the first said contact, means for rocking the shaft to move the brush into engagement with either of the second said contacts, resistance contacts, a brush movable over the resistance contacts, means operatively related to the shaft for moving the last said brush in one direction, means for locking said brush in its adjusted position, and means operatively related to the shaft for releasing the last said brush when the first said brush is in engagement with either of the second said contacts, the last said brush being capable of movement independently of the movement of the shaft and over the contacts when released.

2. In a device of the class described, the combination of a frame, a rock shaft journaled thereon, a contact on the frame standing astride the shaft, a brush secured to the shaft and engaging the contact, a contact arranged on each side of the shaft and coöperating with the first said contact, means for rocking the shaft to move the brush into engagement with either one of the second said contacts, resistance contacts on the frame, a brush movable over said contacts, means operatively related to the shaft for moving the last said brush over the resistance contacts, means for locking said brush in its adjusted position, and means operatively related to the first said brush for releasing the resistance contact brush, said brush being adapted to return over the resistance contacts.

3. In a device of the class described, the combination of a frame, a rock shaft journaled thereon, a contact on the frame standing astride the shaft, a brush secured to the shaft and engaging the contact, a contact arranged on each side of the shaft and coöperating with the first said contact, means for rocking the shaft to move the brush into engagement with either one of the second said contacts, resistance contacts on the frame, a brush movable over said contacts, means operatively related to the shaft for moving the last said brush over the resistance contacts, means for locking said brush in its adjusted position, means operatively related to the first said brush for releasing the resistance contact brush, said brush being adapted to be returned over the resistance contacts, and means for checking the return of the brush.

4. In a device of the class described, the combination of a frame, a shaft journaled thereon, a contact, a brush on the shaft engaging the contact, contacts coöperating with the first said contact and located on opposite sides of the shaft, means for rocking the shaft to move the brush into engagement with either of the coöperating contacts, resistance contacts, a brush frame movable with and also independently of the shaft, a brush supported by the frame and adapted to engage the resistance contacts, a crank on the shaft, an operative connection between the crank and the brush frame for positively shifting the latter to move the brush over the last said contacts in one direction, a catch for locking the frame in its adjusted position, and means operatively related to the shaft and adapted to engage and trip the catch in either direction of movement of the shaft to release the brush frame to permit an independent movement of the frame over the resistance contacts.

5. In a device of the class described, the combination of a support, contacts thereon, a rock shaft, a brush operatively related to the shaft, means for rocking the shaft to move the brush into and out of engagement with the contacts, a frame, resistance contacts, a brush supported by the frame and movable over the resistance contacts, a link pivotally connected by one end to the frame, a yielding connection between the free end of the link and the shaft for shifting the frame to move the last said brushes in one direction over the resistance contacts when the shaft is rocked, means for locking the frame in its adjusted position, and means for releasing the frame.

6. In a device of the class described, the combination of a support, contacts thereon, a rock shaft, a brush operatively related to the shaft, means for rocking the shaft to move the brush into and out of engagement with the contacts, a frame, resistance contacts, a brush supported by the frame and movable in both directions over the resistance contacts, a link pivotally connected by one end to the frame, a yielding connection between the free end of the link and the shaft for shifting the frame to move the last said brushes in one direction over the resistance contacts when the shaft is rocked, means for locking the frame in its shifted position, and means for releasing the frame to permit the latter to be returned independently.

7. In a device of the class described, the combination of a support, contacts thereon, a rock shaft, a brush operatively related to the shaft, means for rocking the shaft to move the brush into and out of engagement with the contacts, a frame, resistance contacts, a brush supported by the frame and movable over the resistance contacts, a link pivotally connected by one end to the frame, a yielding connection between the free end of the link and the shaft for shifting the frame to move the last said brushes in one direction over the resistance contacts when the shaft is rocked, means independent of the shifting means for locking the said frame in its adjusted position, and means for releasing the frame, said frame being capable of movement independent of the said shifting means when released for returning the brushes over the resistance contacts.

8. In a device of the class described, the combination of a frame, contacts thereon, a rock shaft, a brush operatively related to the shaft, a crank on the shaft, a movable frame, resistance contacts, a brush supported by the frame, and adapted to engage the said contacts, a link pivotally connected by one end to the frame, a sliding connection between the crank and the free end of the link, and means for rocking the shaft to move the first said brush into and out of engagement with its respective contacts and for shifting the frame to move the brush in one direction over the resistance contacts, said frame being adapted for independent movement to cause the brush to move in the opposite direction over the resistance contact.

9. In a device of the class described, the combination of a support, contacts thereon, a rock shaft, a brush operatively related to the shaft and adapted to be moved into and out of engagement with the contacts, a movable support, resistance contacts, a brush on the last said support, engaging said contacts, a link pivotally connected by one end to the movable support, and being provided with an elongated slot in its free extremity, a crank on the shaft, a lateral projection on the crank, said projection extending into and movable in the slot, means for rocking the shaft to move the first said brush into and out of operative position and for shifting the second said support to move the brush thereon in one direction over the resistance contacts, means for locking the support in its adjusted position, and means for releasing said support when the first said brush has assumed an operative position, said frame being adapted to be returned to cause a movement of the brush over the resistance contacts in the opposite direction, independent of the movement of the first said brush.

10. In a device of the class described, the combination of a support, contacts thereon, a rock shaft, a brush operatively related to the shaft and adapted to be moved into and out of engagement with the contacts, a movable support, resistance contacts, a brush on the last said support, engaging said contacts, a link pivotally connected by one end to the movable support, and being provided with an elongated slot in its free extremity, a crank on the shaft, a cushioned bearing movable in the slot, an axle on the crank, one end of said axle being journaled in the bearing, means for rocking the shaft to move the first said brush into and out of operative position and for shifting the second said support to move the brush thereon in one direction over the resistance contacts, means for locking the support in its adjusted position, and means for releasing said support when the first said brush has assumed an operative position, said frame being adapted to be returned to cause a movement of the brush over the resistance contacts in the opposite direction, independent of the movement of the first said brush.

11. In a device of the class described, the combination of a support, contacts thereon, a rock shaft, a brush operatively related to the shaft and movable into and out of engagement with the contacts, a second support, provided with alined elongated apertures, a movable support provided with projections extending into the apertures links pivotally secured by one end to the projections and having pivotal connection with the second said support for guiding the movable support, resistance contacts on the second support, a brush on the movable support, engaging said contacts, an operative connection between the shaft and the movable support, means for rocking the shaft to move the first said brush and to shift the movable support to move the brush thereon in one direction over the resistance contacts, and means operatively related to the shaft for releasing the movable support when the first said brush is in operative position, said support being adapted to be returned to move the brush in the opposite direction over the resistance contacts.

12. In a device of the class described, the combination of a support, contacts thereon, a rock shaft, a brush operatively related to the shaft and movable into and out of engagement with the contacts, a second support, provided with alined elongated apertures, a movable support provided with projections extending into the apertures, links pivotally secured by one end to the projections and having pivotal connection with the second said support for guiding the movable support, resistance contacts on the second support, a brush on the movable support, engaging said contacts, an operative connection between the shaft and the movable support, means for rocking the shaft to move the first said brush and to shift the movable support to move the brush thereon in one direction over the resistance contacts, means operatively related to the shaft for releasing the movable support when the first said brush is in operative position, said support being adapted to be independently returned to move the brush in the opposite direction over the resistance contacts and means for controlling the return movement of the support.

13. In a device of the class described, the combination of a support, contacts thereon, a rock shaft, a brush operatively related to the shaft, and adapted to be moved into and out of engagement with the contacts, a movable support, resistance contacts, a brush on the last said support, an operative connection between the shaft and the movable support, means for rocking the shaft to move the first said brush, and for shifting the second said support to move the brush thereon in one direction over the contacts, a latch adapted to engage and lock said support in its adjusted position, said shaft being provided with an operative face adapted to engage and trip the latch when the first said brush is in operative position, to release the frame, and means for permitting said frame to return independently and move the brush in the opposite direction over the resistance contact.

14. In combination, in a device of the class described, resistance contacts, a movable frame, a brush support extending across the frame, means for pivotally and removably securing the ends of said support to the frame, a brush on the support, and means for moving the frame to cause the brush to successively engage the contacts.

15. In combination, in a device of the class described, resistance contacts, a movable frame, a brush support extending across the frame, a brush removably supported thereby, means for pivotally and removably securing the ends of the support to the frame, means for yieldingly holding said brush normally in engagement with one of the resistance contacts, and means for moving the frame to cause the brush to successively engage the contacts.

16. In combination, in a device of the class described, resistance contacts, a movable frame, a brush support extending across the frame, a brush removably supported thereby, and comprising a plurality of sections, means for removably and pivotally connecting each of the ends of the support to the frame, means for yieldingly holding said sections normally in engagement with one of the resistance contacts, and means for moving the frame to cause the brush to successively engage the contacts.

17. In combination, in a device of the class described, resistance contacts, a movable frame, an apertured projection extending from each side of the frame, a support extending across the frame and provided with an aperture in each end thereof, adapted to register with the aperture in the respective projection, a removable member passing through the registering apertures, a brush on the support engaging the contacts and means for moving the frame to cause the brush to be moved over the contacts, either one of the members being adapted to be removed to permit the support to be swung away from the frame and about the other member as a pivot.

In testimony whereof I have signed my name to this specification, in the presence of two subscribing witnesses, on this 4th day of June, A. D. 1907.

HUGO W. FORSLUND.

Witnesses:
CHAS. H. SEEM,
J. H. JOCHUM, Jr.